United States Patent
Smith et al.

[19]

[11] Patent Number: 6,126,457
[45] Date of Patent: Oct. 3, 2000

[54] ROUTED WIRE ELECTRICAL CENTER ADAPTER

[75] Inventors: Randall Kent Smith, Fowler; Eric Owen Bartlett, Tallmadge; Michael Anthony DeAngelis, Warren, all of Ohio

[73] Assignee: General Motors Corporation, Detroit, Mich.

[21] Appl. No.: 08/953,304

[22] Filed: Oct. 17, 1997

[51] Int. Cl.$^7$ ....................................................... H01R 9/09
[52] U.S. Cl. .......................................... 439/76.2; 439/949
[58] Field of Search .................................. 439/76.2, 949

[56] References Cited

U.S. PATENT DOCUMENTS

| | | | |
|---|---|---|---|
| 4,332,430 | 6/1982 | Clark | 439/83 |
| 4,564,251 | 1/1986 | Hansen et al. | 439/71 |
| 4,620,761 | 11/1986 | Smith et al. | 439/372 |
| 4,652,973 | 3/1987 | Baker et al. | 361/739 |
| 4,684,765 | 8/1987 | Beck et al. | 174/68.5 |
| 5,023,752 | 6/1991 | Detter et al. | 361/752 |
| 5,151,039 | 9/1992 | Murphy | 439/70 |
| 5,207,587 | 5/1993 | Hamill et al. | 439/76.2 |
| 5,295,842 | 3/1994 | Ozaki et al. | 439/76.2 |
| 5,295,847 | 3/1994 | Ozaki et al. | 439/212 |
| 5,300,917 | 4/1994 | Maue et al. | 338/49 |
| 5,310,353 | 5/1994 | Parrish et al. | 439/76.2 |
| 5,410,443 | 4/1995 | Pelegris | 361/119 |
| 5,415,568 | 5/1995 | Kinoshita | 439/610 |
| 5,482,092 | 1/1996 | Van Zeeland et al. | 140/92.1 |
| 5,537,295 | 7/1996 | Van Den Bout et al. | 361/767 |
| 5,605,465 | 2/1997 | Kobayashi et al. | 439/76.2 |
| 5,653,607 | 8/1997 | Saka et al. | 439/76.2 |
| 5,722,851 | 3/1998 | Onizuka et al. | 439/76.2 |

*Primary Examiner*—Renee S. Luebke
*Assistant Examiner*—T C Patel
*Attorney, Agent, or Firm*—Patrick M. Griffin

[57] ABSTRACT

A routed wire electrical center adapter for coupling electrical components having varying terminal footprints with standard electrical center components having a standard terminal footprint through an adapter element within the electrical center including application specific electrical elements for receiving, on a first element end, electrical terminals of a first footprint, and for receiving, on a second element end opposing the first element end, electrical terminals of a second footprint. The first footprint is selected from a wide range of footprints as specified in an application. The second footprint is a standard footprint across a broad range of electrical center applications.

20 Claims, 5 Drawing Sheets

ROUTED WIRE ELECTRICAL CENTER ADAPTER

TECHNICAL FIELD

This invention relates to automotive electrical distribution centers and, more particularly, to adapting routed wire electrical distribution centers for application with components having varying footprints.

BACKGROUND OF THE INVENTION

Automotive electrical distribution centers are generally known for packaging such electrical elements as fuses and relays and providing for electrical bussing in a single block, providing for cost and reliability benefits. Such electrical centers have been proposed using routed wire plates in the form disclosed in copending U.S. Pat. No. 5,715,135, assigned to the assignee of this application, in which electrical busses comprising links of electrically conductive wire are selectively routed through passages in standard insulator plates, for flexible electrical bussing in a standard environment. The wire routing through the standard insulator plates may be readily adapted to accommodate a wide variety of applications having varying electrical element layouts.

However, the elements of electrical centers including the insulator plates, housings, connectors, connector sockets, and the routed wire electrical bussing cannot readily be adapted to accommodate applications involving electrical elements having substantially non-conforming electrical terminal "footprints" or, in other words, substantially non-conforming terminal widths, spacings, and orientations. Accordingly, the scope of application of the components of a standard routed wire electrical center is limited to those applications involving electrical elements having a substantially common electrical terminal footprint. It is recognized that a significant range of electrical center applications include electrical elements having non-standard terminal footprints. It would be desirable to adapt electrical centers, especially of the routed wire type, to accommodate the terminal footprints of such applications so that they may be readily used with a maximum complement of standard electrical center components, such as standard housings, connectors, connector sockets, insulator plates, and routed wire electrical bussing elements, to reduce cost and design lead time.

SUMMARY OF THE INVENTION

The present invention is directed to an electrical center including routed wire technology for application with electrical elements having dissimilar electrical terminal footprints. More specifically, an adapter layer is provided within the electrical center for receiving, on a first side, electrical terminals of a variety of terminal footprints and for receiving, on a second side opposing the first side, electrical terminals of a standard footprint, whereby the terminal footprint of electrical elements required in an application may be adapted to interface with the standard electrical element footprint of a standard electrical center.

In accord with a further aspect of this invention, the standard electrical element footprint is a regular rectangular footprint array, such as the generally-known "280" footprint and the non-standard or application specific footprints include, among other footprints, an "ISO" footprint, as defined in the International Standards Organization ISO/TC22/SC3 N766 and N767 standard. In accord with yet a further aspect of this invention, the adapter layer includes a plurality of stamped metal elements with each of the plurality assigned to electrically couple a terminal of an electrical component, such as a relay or fuse component, with an electrical center terminal in the standard footprint.

In accord with yet a further aspect of this invention, the stamped metal elements include opposing first and second terminal ends. The first terminal ends take the form of female tuning fork terminals for receiving and securely contacting electrical component terminals of the non-standard terminal footprint. The second terminal ends take the form of male flat blade terminals arranged in a standard footprint, such as the 280 footprint. Accordingly, the components of the electrical center on a first side of the stamped metal elements, such as the side corresponding to the first terminal end, are application specific, having varying terminal and bussing orientations depending on a specific application requirement. However, the components of the electrical center on a second side of the stamped metal elements, such as a side corresponding to the second terminal end, are standard across a wide range of applications including a wide range of electrical element footprints, resulting in lower electrical center cost and reduced development time.

BRIEF DESCRIPTION OF THE DRAWINGS

The invention may be best understood by reference to the preferred embodiment and to the drawings in which.

DESCRIPTION OF THE PREFERRED EMBODIMENTS

Figure 1:
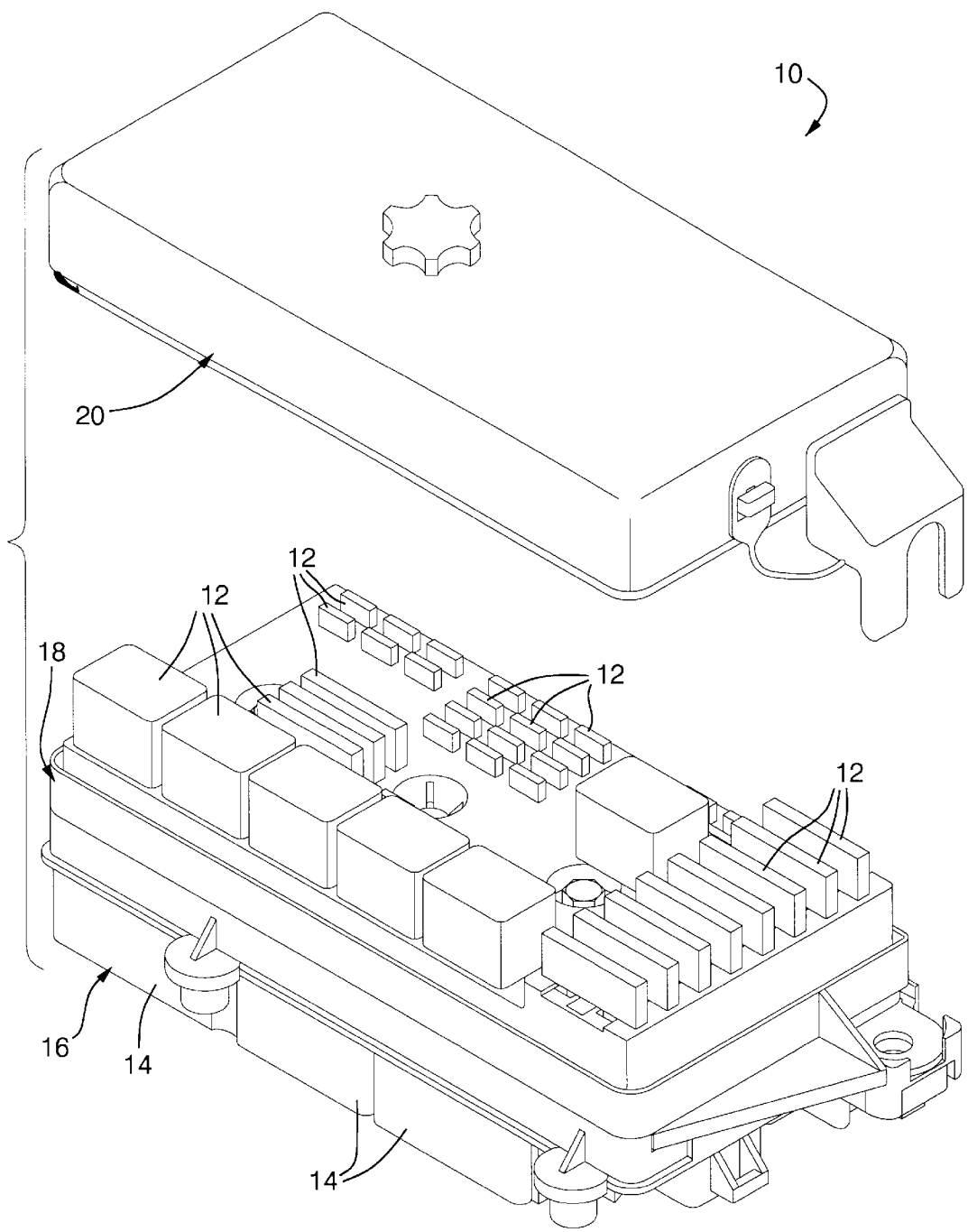
FIG. 1 is a perspective view of an electrical distribution center in accordance with an embodiment of this invention.

Referring to FIG. 1, an electrical distribution center 10 provides an electrical interconnect between electrical devices 12, such as mini-fuses, maxi-fuses, and relays that are inserted into a first side of the electrical center 10, and the electrical connectors of wiring harnesses (not shown) that are inserted into a plurality of connector sockets 14 on a second side, opposing the first side, of the electrical center 10. The electrical center 10 typically includes first and second housings 16 and 18 and a cover 20 all of which are molded from a thermoplastic electrically insulative material. The first and second housings (16 and 18) are sized to mate together within the electrical center 10. The connector sockets 14 may be molded as an integral part of the first housing 16. The electrical elements 12 are inserted into terminal cavities (not shown) molded into the second housing 18 and may be further secured in such insertion position by the cover 20 when the cover is secured over the first and second housings (16, 18). The electrical center may generally be configured as described in U.S. Pat. No. 5,023,752, assigned to the assignee of this invention and hereby incorporated herein by reference.

Figure 2:
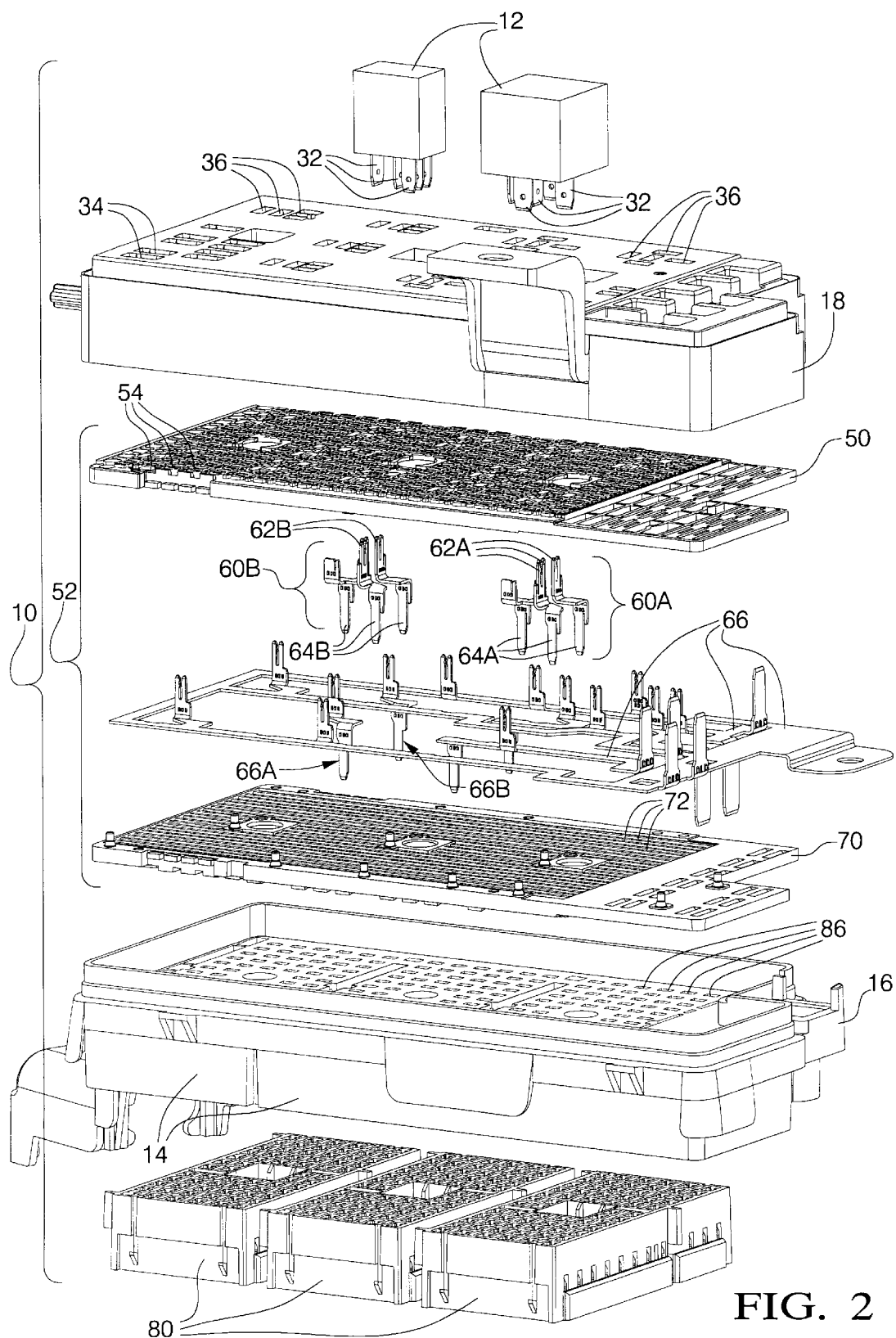
FIG. 2 is an exploded view of the electrical distribution center of FIG. 1.

Referring to FIG. 2, an exploded view of the electrical center of FIG. 1 details various electrical center components, including a second housing 18 (also referred to herein as an upper housing) having a plurality of passages 34 therethrough for receiving terminals of electrical elements secured thereto, including passages 36 corresponding to a non-standard terminal footprint, such as an ISO footprint in this embodiment, as may be specified for a specific application of the electrical center 10. The passages 36 are configured to receive the electrical terminals 32 of corresponding electrical elements 12, such as ISO Micro and Mini relays in this embodiment, whereby the electrical terminals extend through the passages 36.

Likewise, a first housing 16 (also referred to herein as a lower housing) includes a plurality of passages 86 passing through a first side of the housing 16 for receiving terminals of electrical elements secured thereto, such as elements 60a and 60b, to be described, wherein such passages 86 correspond to a standard terminal footprint, such as the regular rectangular array of footprints generally referred to as "280" footprint. The "280" footprint is referred to in the generally available Society of Automotive Engineers standard SAE J1744, wherein the passages 86 are sized to receive a 2.8 mm terminal blade, and are spaced by 7.8 mm on a first axis and by 8.1 mm on a second axis across the array of passages 86 of the housing 16. A plurality of connector sockets 14 are molded into the second side of the lower housing opposing the first side for receiving electrical connectors of wiring harnesses (not shown), the electrical contacts of which connectors are electrically coupled to the terminals that extend through the passages 86.

A main bus plate assembly 52 including stamped metal electrical adapter elements 60a and 60b and standard stamped metal element 66, disposed between a top routed wire press fit plate 50 and a bottom routed wire press fit plate 70, provides for a transition between the standard electrical element footprint of the lower housing 16 (and the electrical connectors of wiring harnesses interfacing therewith), such as the generally-recognized standard "280" footprint, and the custom (application specific) electrical element footprint or footprints of the electrical elements 12 interfacing with the upper housing 18. In this embodiment, the application specific footprints of the electrical elements 12 includes the generally-known ISO Micro and Mini Relay footprints. Such a transition allows for use of standard electrical center components across a greatly increased number of applications and retains the described benefits of routed wire bussing. For example, the elements of the electrical center 10 on one side of the stamped metal elements 60a, 60b and 66, such as below such components in FIG. 2, is standard over a wide range of applications while the elements of the electrical center 10 on the other side of the stamped metal elements 60a, 60b, and 66 are custom for a specific application. Such a configuration improves the flexibility of the electrical center 10 in that component changes in an application can be readily implemented with minimum impact on standard electrical center 10 components.

The top routed wire press fit plate 50 takes the form of an insulation board of molded thermoplastic material having a program-specific pattern of passages through which terminals of the stamped metal electrical elements pass for retaining the terminals in the program-specific pattern. The bottom routed wire press fit plate 70 takes the form of an insulation board of molded thermoplastic material having a standard pattern of passages through which terminals of the stamped metal electrical elements pass for retaining the terminals in the standard pattern. Upper terminals 62a and 62b of respective stamped metal electrical elements 60a and 60b pass through passages 54 of the top routed wire press fit plate 50 upon installation therewith, and lower terminals 64a and 64b of respective stamped metal electrical elements 60a and 60b pass through passages 72 of the bottom press fit plate 70 upon installation therewith.

Various types of stamped metal electrical elements, such as elements 60a, 60b, and 66 may be used in this embodiment, each type having female "tuning fork" terminals, such as terminals 62a and 62b, extending through the top press fit plate 50 and having male terminals, such as terminals 64a and 64b, extending through the bottom press fit plate 70. Generally, the electrical elements, such as elements 60a and 60b, are selected on a program-specific basis to carry electrical signals across the main bus plate 52 between the program specific elements 12 installed in the electrical center 10 of FIG. 2 and a plurality of standard components of the electrical center 10, including for example a standard plurality of connector sockets 14 which interface with a standard plurality of wiring harness connectors (not shown), and a standard lower routed wire press fit plate 70. Further detail of the stamped metal electrical elements (60a and 60b) providing a transition between elements of varying footprints is provided in FIGS. 3 and 4.

Figure 5:
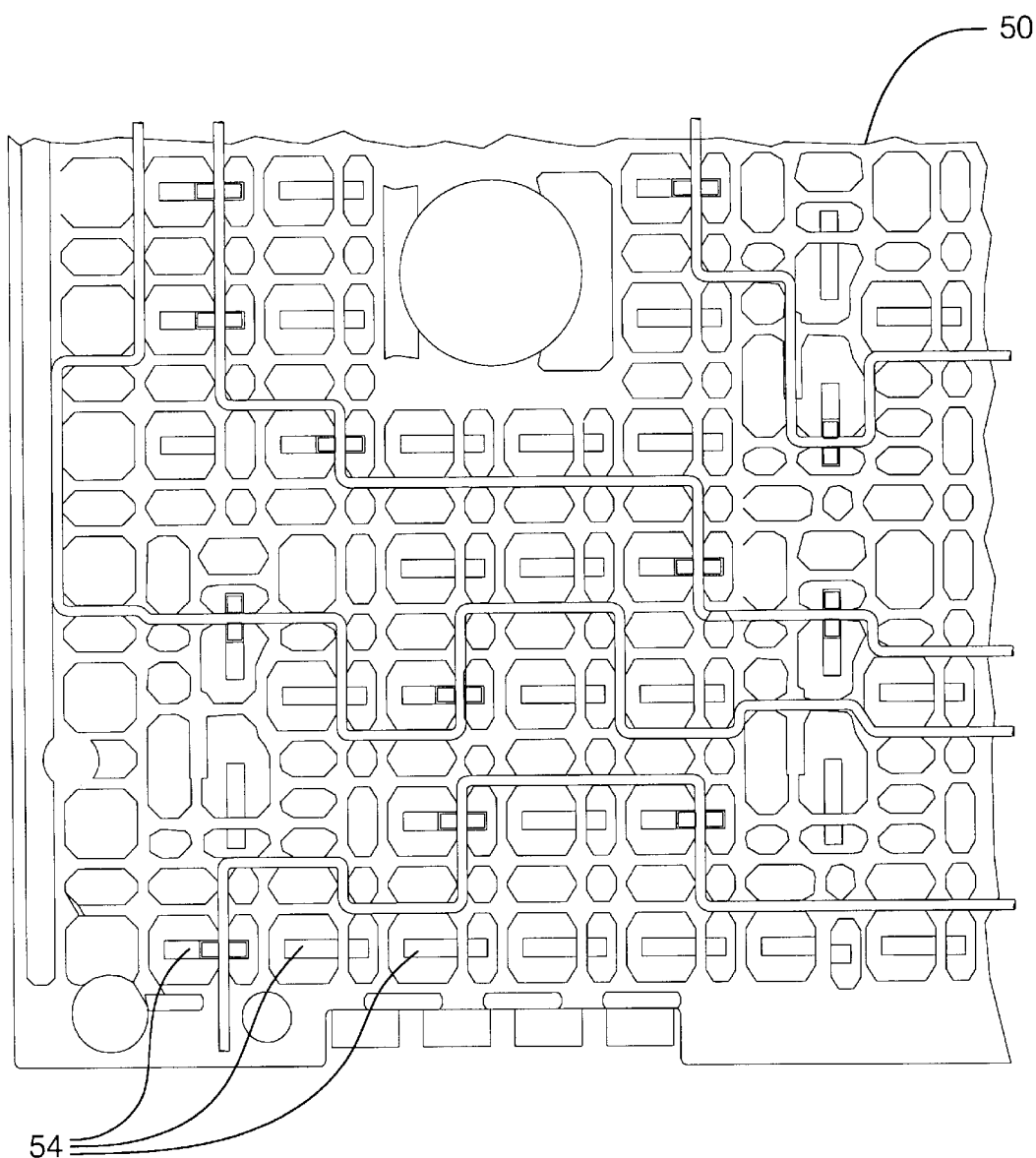
FIG. 5 is a fragmentary enlarged perspective view of a portion of the upper routed wire press fit plate of the electrical distribution center illustrated in FIG. 2.

Returning to FIG. 2, each of the plates 50 and 70 includes, on a side opposing the side receiving the terminals of the electrical elements 60a, 60b, and 66, a network of wire channels that communicate with wire passages that extend through terminals and guide stations of the form described in U.S. Pat. No. 4,684,765, assigned to the assignee of this application and hereby incorporated herein by reference. The terminals also have terminal slots that extend through the routing board to intersect the wire passages. Routed through the wire channels are electrical busses comprising lengths of electrically conductive wire 53 (FIG. 5) that pass through various terminal and guide stations via the network of wire channels in a program-specific pattern. Suitable routed wire plates and a suitable method of their manufacture are disclosed in the incorporated U.S. Pat. No. 4,684,765. The electrically conductive wire that is included in the upper and lower routed wire press fit plates (50, 70) is preferably a solid core 20 gage copper wire which is easily routed onto the routed wire press fit plates and adequate to bus relatively low current, such as about fifteen amperes continuous current.

Figure 3:
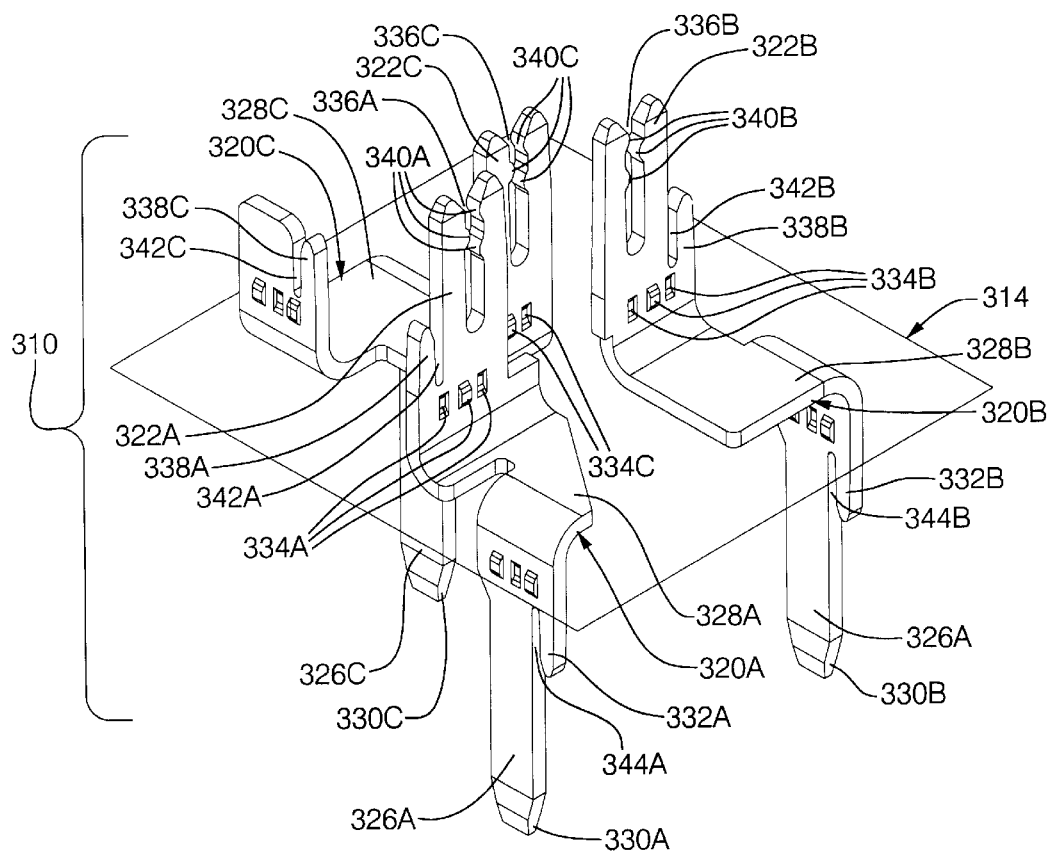
FIG. 3 is a perspective view of a configuration of stamped metal electrical elements for use in the electrical distribution center of FIG. 2, for transmitting between electrical terminal footprints in accordance with the preferred embodiment of this invention.

Referring to FIG. 3, a plurality of stamped metal electrical elements 320a–320c are secured in any suitable conventional manner to a mylar sheet 314 to form an adapter cartridge 310. More specifically, in this embodiment, the electrical elements 320a–320c are secured to the mylar sheet 314 by interposing a suitable conventional adhesive between the sheet 314 and a substantially flat central section 328a–328c of each of the respective elements 320a–320c. Upper ends 322a–322c of the respective electrical elements 320a–320c generally take the form of flat planar female tuning fork terminals and extend through openings (not shown) in the mylar sheet 314. Lower ends 326a–326c, opposing the respective upper ends 322a–322c, generally take the form of flat male blade terminals with tapered ends 330a–330c.

The adapter cartridge 310 is placed during an installation procedure into one of the routed wire press fit plates (50, 70 of FIG. 2) in position providing that the first ends 322a–322c of the respective elements 320a–320c extend through corresponding passages in the routed wire press fit plate 50 (FIG. 2) and receive, within slots 336a–336c, respectively, corresponding terminals of a ISO Micro relay that has been installed on the upper housing 18 (FIG. 2), as described. Groups of complementary projections 340a–340c stamped on the first ends 322a–322c, respectively, extend into each respective slot 336a–336c so as to form, upon installation with the Micro relay terminals, a robust three-point electrical contact.

Each upper end 322a–322c and each lower end 326a–326c includes, near the base of its blade, a series of projections 334a–334c of any suitable conventional design for retaining, upon complete insertion of the upper ends through corresponding passages 54 of the upper routed wire press fit plate 50 of FIG. 2, and upon complete insertion of the lower ends 326a–326c through corresponding passages 72 in the lower routed wire press fit plate 70 of FIG. 2, the cartridge 310 in position relative to the upper and lower routed wire press fit plates 50 and 70. The upper ends 322a–322c include narrow wire receiving slots 342a–342c, respectively, of the insulation displacement type near the base of the blades, that are provided by short fingers 338a–338c, respectively, disposed on one or both sides of the blades. The width of each of the wire receiving slots 342a–342c is narrower than the conductor core of the wire it receives upon installation with the routed wire press fit plate 50 of FIG. 2 as described, so that robust electrical contact is established when the wire is pushed into the slot in a well-known manner. Likewise, the lower ends 326a–326c include narrow wire receiving slots 344a–344c, respectively, of the insulation displacement type near the base of the blades, that are provided by short fingers 332a–332c, respectively, disposed on one or both sides of the blades. The width of each of the wire receiving slots 344a–344c is narrower than the conductor core of the wire it receives upon installation with the routed wire press fit plate 70 of FIG. 2 as described, so that robust electrical contact is established when the wire is pushed into the slot in a well-known manner. Further detail describing coupling of the stamped metal electrical elements 320a–320c with the routed wire plates is disclosed in U.S. Pat. No. 5,207,587, hereby incorporated herein by reference.

The electrical elements 320a–320c of FIG. 3 are stamped, and the upper female "tuning fork" and lower male blade terminal ends thereof bent in a perpendicular direction relative to the central section (328a–328c) of the elements, to form a combination of electrically conductive elements that may be directly coupled to the electrical terminals of electrical components having a first predetermined footprint, such as a standard ISO footprint on a first end of the elements 320a–320c, and that may be directly coupled to the electrical terminals of electrical components having a second predetermined footprint, such as the well-known "280" series footprint on a second end of the elements 320a–320c. For example, the upper ends 322a–322c of the electrical elements 320a–320c of FIG. 3 are oriented to receive the standard footprint characteristic of the male blade terminals of an ISO Micro relay device (not shown), whereby the terminals pass, upon installation into an electrical center, such as the electrical center of FIG. 1, directly into the passages 336a–336c. The lower ends 326a–326c of the electrical elements 320a–320c are oriented to receive the standard footprint associated with a standard electrical center, such as of the well-known "280" footprint, so that a standard routed wire press fit plate 70, a standard lower housing 16, and standard wiring harness connectors (FIG. 2) may be used in applications specifying a wide variety of electrical components having varying footprints installed in upper housing 18 (FIG. 2). To provide such an essential feature of this invention, each of the electrical elements 320a–320c takes on a shape needed to carry signals between two potentially varying footprints. Some of such electrical elements may take a flat coplanar shape as in the incorporated references, and others may take on the general shape of elements 320a–320c, in which the upper ends 322a–322c, respectively, lie in a plane perpendicular to the respective lower ends 326a–326c. Still others such as elements 66A and 66B (FIG. 2) may be required to take on a general shape (not shown) in which the upper ends of the elements lie in a plane parallel to but offset by a predetermined spacing from the lower ends of the elements. Still other stamped metal electrical elements may take on further shapes as needed to couple electrical element terminals having varying terminals footprints in accordance with this invention. The inventors intend that the electrical elements 320a–320c may be directly installed into the top routed wire press fit plate 50 (FIG. 2) or the bottom routed wire press fit plate 70 (FIG. 2) without resort to use of the mylar sheet 314 of FIG. 3 in accordance with an embodiment of this invention.

Figure 4:
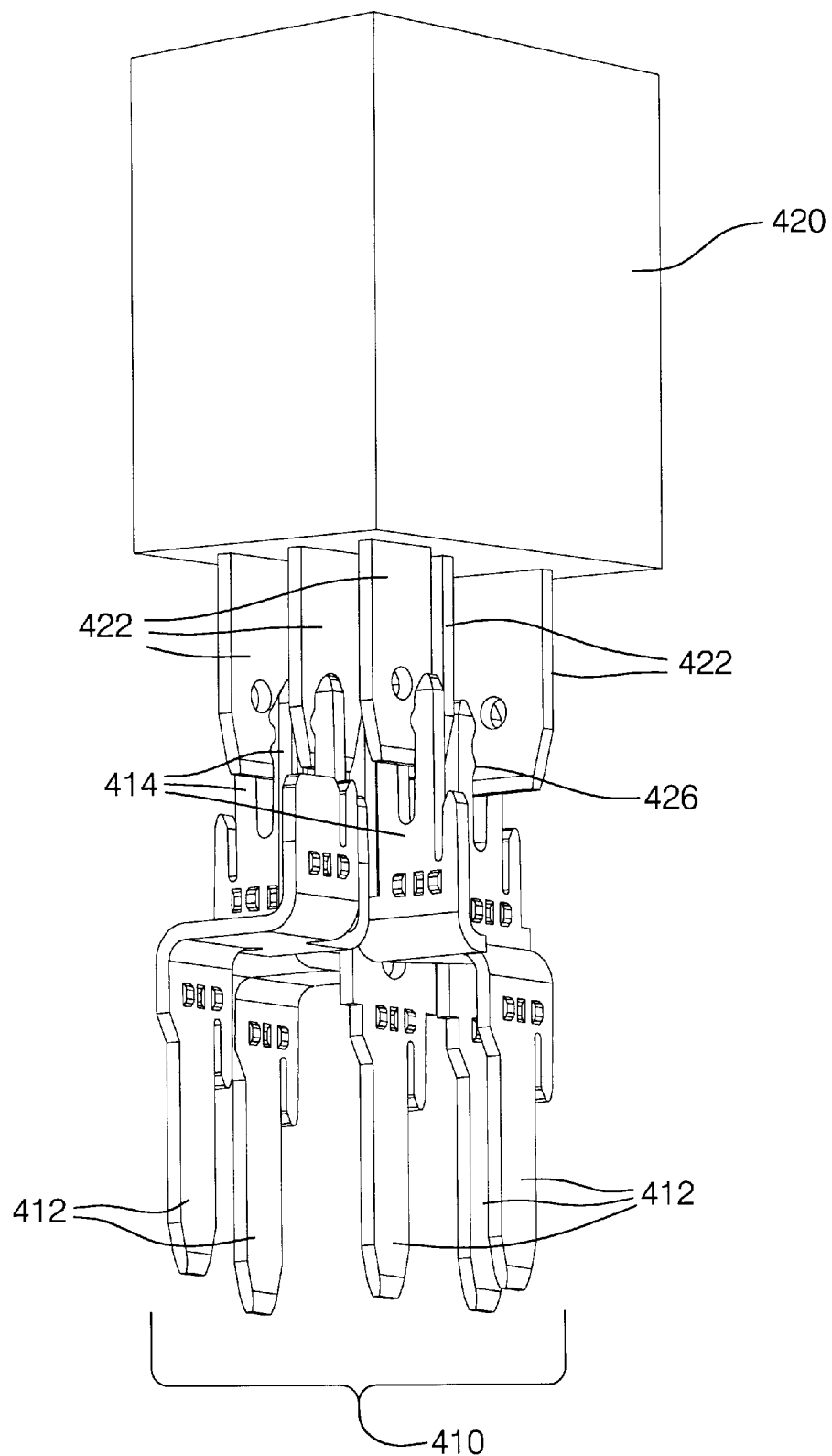
FIG. 4 is a perspective view of another configuration of stamped metal electrical elements of FIG. 2 electrically coupled, on a first element end, to electrical terminals of a ISO Mini relay in accordance with an embodiment of this invention.

Referring to FIG. 4, an installation of a plurality of stamped metal electrical elements 410 in accord with this invention with a conventional ISO Micro relay 420 illustrates the engagement of the relay terminals 422 configured in an ISO footprint with the corresponding passages of the upper ends 414 of the electrical elements 410, such as passage 426, with the lower ends 412 arranged in a configuration compatible with the generally-known "280" footprint, providing for signal transmission between the ISO Micro relay terminals and connectors of a "280 footprint" or other standard footprint electrical center. Each of the electrical elements 410 takes on a shape, through the exercise of ordinary skill in the art, to provide for a desired electrical coupling between a specific terminals of a first device having a first terminal footprint and a specific terminal of a second device having a second terminal footprint, wherein the first and second footprints may be the same or may be substantially different, and wherein any of the terminals may be electrically coupled together as specific in an application. The inventors intend that the electrical elements may provide for electrical coupling between a wide variety of electrical components of an electrical center, including components having a wide variety of footprints, in addition to the coupling between the ISO and 280 footprints of FIGS. 3 and 4.

The preferred embodiment is not intended to limit or restrict the invention since many modifications may be made through the exercise of ordinary skill in the art without departing from the scope of the invention.

The embodiments of the invention in which a property or privilege is claimed are described as follows:

We claim:

1. A routed wire electrical center adapted for coupling electrical elements having terminals with dissimilar terminal orientations, comprising:

a first plate having a pattern of channels through which at least one electrical conductor is routed and having a first pattern of passages disposed therethrough, the first pattern of passages arranged in a first orientation with at least a portion of the passages having a width dimension extending in a first direction;

a second plate having a second pattern of passages disposed therethrough in a second orientation differing from the first orientation with at least a portion of the passages having a width dimension extending in a second direction transverse to the first direction; and an electrical adapter interposed between the first and second plates for translating between the first and second orientations, the electrical adapter comprising a plurality of electrically conductive elements having first and second ends with the first ends configured for electrically coupling with terminals of the first orientation and arranged for passage through at least said portion of the pattern of passages of the first plate and for electrically coupling with said electrical conductor and the second ends configured for electrically coupling with terminals of the second orientation and arranged for passage through at least a portion of the pattern of passages of the second plate.

2. The routed wire electrical center of claim 1, wherein the first orientation corresponds to the International Standards Organization electrical terminal orientation.

3. The routed wire electrical center of claim 1, wherein the second orientation is a regular rectangular array orientation corresponding to the "280" series orientation.

4. The routed wire electrical center of claim 1, wherein the first ends are further configured for selective electrical coupling with the electrical conductors routed through the pattern of channels of the first plate.

5. The routed wire electrical center of claim 1, wherein the second plate includes a pattern of channels through which at least one electrical conductor is routed for electrical signal bussing.

6. The electrical center of claim 1 wherein at least one of a portion of said first plate passages is oriented with its width dimension perpendicular to the like dimension of another of said portion of said first plate passages, and wherein all of said second plate passages are oriented such that their width dimensions extend parallel to one another.

7. A routed wire electrical connector as defined in claim 1 wherein said electrically conductive elements each have a flat central portion with first and second peripheral edge portions to which said first and second terminal ends respectively are integrally joined and are bent therefrom to extend longitudinally perpendicularly from said flat central portion and in opposite directions therefrom, said flat central portion being oriented with the plane defined by its length and width dimensions disposed parallel to the planes defined by the length and width dimensions of said plates.

8. A routed wire electrical center for housing at least one electrical component having electrical terminals arranged in a non-standard footprint and for electrically coupling the electrical terminals of the electrical component with electrical center terminals arranged in a standard terminal orientation, comprising:

a first routed wire plate of the electrical center having routed wire bussing and having passages therethrough arranged in a first orientation corresponding to the non-standard footprint and having at least a portion of the passages having a width dimension extending in a first direction;

a second routed wire plate of the electrical center having passages therethrough in a second orientation differing from said first orientation and corresponding to the standard orientation and having at least a portion of the passages having a width dimension extending in a second direction transverse to the first direction; and an adapter interposed between the first and second routed wire plates and including a plurality of electrically conductive elements with individual elements of the plurality oriented for insertion in said passages of said first and second plates for electrically coupling an electrical terminal of the electrical component with a corresponding electrical center terminal, whereby electrical signals are carried between electrical terminals of the electrical component and corresponding electrical center terminals via the electrically conductive elements.

9. The electrical center of claim 8, wherein the standard terminal orientation is a regular rectangular array orientation corresponding to the "280" terminal orientation.

10. The electrical center of claim 9, wherein the non-standard footprint corresponds to an "ISO" footprint.

11. The electrical center of claim 8, wherein the plurality of electrically conductive elements have opposing first and second terminal ends, the first terminal ends configured in the first orientation for extending through passages in the first routed wire plate for electrical coupling with the terminals of the electrical component, and the second terminal ends configured in the standard orientation for extending through the passages in the second routed wire plate for electrical coupling with the electrical center terminals.

12. The electrical center of claim 11, wherein the electrically conductive elements comprise stamped metal elements having, on the first terminal end, female tuning fork terminals for receiving the terminals of the electrical component and having, on the second terminal end, male terminal blades for electrical coupling with electrical center terminals.

13. The electrical center of claim 12 wherein said stamped metal elements include on said first terminal end a narrow wire receiving and insulation displacing slot defined by a finger offset lateral from said female tuning fork terminal of said first terminal end for electrically coupling with an associated routed wire of said first plate.

14. A routed wire electrical connector as defined in claim 8 wherein said electrically conductive elements each have a flat central portion with first and second peripheral edge portions to which said first and second terminal ends respectively are integrally joined and are bent therefrom to extend longitudinally perpendicularly from said flat central portion and in opposite directions therefrom, said flat central portion being oriented with the plane defined by its length and width dimensions disposed parallel to the planes defined by the length and width dimensions of said plates.

15. A routed wire electrical center for housing at least one electrical component having electrical terminals arranged in a non-standard footprint and for electrically coupling the electrical terminals of the electrical component with electrical center terminals arranged in a standard terminal orientation, comprising:

a first routed wire plate of the electrical center having routed wire bussing and having passages therethrough arranged in a first orientation corresponding to the non-standard footprint;

a second routed wire plate of the electrical center having passages therethrough in a second orientation differing from said first orientation and corresponding to the standard orientation; and an adapter interposed between the first and second routed wire plates and including a plurality of electrically conductive elements with individual elements of the plurality oriented for insertion in said passages of said first and second plates for electrically coupling an electrical terminal of the electrical component with a corresponding electrical center terminal, whereby electrical signals are carried between electrical terminals of the electrical component and corresponding electrical center terminals via the electrically conductive elements, wherein the plurality of electrically conductive elements have opposing first and second terminals ends, the first terminal ends are configured in the first orientation for extending through passages in the first routed wire plate for electrical coupling with the terminals of the electrical component, and the second terminal ends are configured in the standard orientation for extending through the passages in the second routed wire plate for electrical coupling with the electrical center terminals, wherein the electrically conductive elements comprise stamped metal elements having, on the first terminal end, female tuning fork terminals for receiving the terminals of the electrical component and having, on the second terminal end, male terminal blades for electrical coupling with electrical center terminals, and wherein said electrically conductive elements each have a flat central portion with first and second peripheral edge portions to which said first and second terminal ends respectively are integrally joined and are bent therefrom to extend longitudinally perpendicularly from said flat central portion and in opposite directions therefrom, said flat central portion being oriented with the plane defined by its length and width dimensions disposed parallel to the planes defined by the length and width dimensions of said plates.

16. The electrical center of claim 15 wherein said first and second peripheral edge portions of said flat central portion are oriented perpendicularly to one another.

17. The electrical center of claim 15 wherein said first and second peripheral edge portions of said flat central portion are oriented parallel to one another.

18. The electrical center of claim 17 wherein said flat central portion includes a third peripheral edge portion extending between and perpendicular to said first and second peripheral edge portions, and said electrically conductive element has a third terminal end bent from said third peripheral edge portion and extending longitudinally perpendicular to said flat central portion and in the same direction as said first terminal end and being configured for extending through an associated passage in said first plate.

19. The electrical center of claim 18 wherein said third terminal end has a narrow wire receiving and insulation displacing slot defined by an edge finger offset laterally from a main body portion of said third terminal.

20. The electrical center of claim 15 wherein a plurality of said electrically conductive elements are held together in a predetermined spaced apart array as a unitary preformed adapter cartridge subassembly wherein said flat central portions of said plurality of elements are disposed co-planar with one another in said adapter cartridge and are adherently secured on at least one flat surface thereof to a planar plastic sheet constructed and arranged to serve as the element retaining base of said adapter cartridge prior to installation thereof in said electrical center.

* * * * *